United States Patent [19]

Nomaguchi et al.

[11] 4,429,735
[45] Feb. 7, 1984

[54] SIMPLIFIED AIR CONDITIONER

[75] Inventors: Tamotsu Nomaguchi; Masahiro Tano, both of Amagasaki; Mitsuo Fukuda; Tatsuo Saitou, both of Nakatsugawa, all of Japan

[73] Assignee: Mitsubishi Denki Kabushiki Kaisha, Tokyo, Japan

[21] Appl. No.: 302,359

[22] Filed: Sep. 15, 1981

Related U.S. Application Data

[63] Continuation of Ser. No. 90,309, Nov. 1, 1979, abandoned.

[30] Foreign Application Priority Data

Nov. 7, 1978 [JP]  Japan .................................. 53-137093
Mar. 13, 1979 [JP]  Japan .................................. 54-29161

[51] Int. Cl.³ ............................ F23L 15/02; F24F 3/14
[52] U.S. Cl. ........................................ 165/60; 62/304; 62/311; 165/8
[58] Field of Search ................ 62/305, 304, 309, 310, 62/311; 165/8, 60; 237/46

[56] References Cited

U.S. PATENT DOCUMENTS 3,964,268  6/1976  Di Peri .............................. 62/304 X

FOREIGN PATENT DOCUMENTS 52-4444  3/1977  Japan .................................. 62/304

Primary Examiner—Edward C. Favors
Assistant Examiner—Henry Bennett
Attorney, Agent, or Firm—Wenderoth, Lind & Ponack

[57] ABSTRACT

The disclosed air conditioner comprises a suction and an exhaust blower connected to a common electric motor and disposed on a suction and an exhaust passageway adjacent to a suction and an exhaust port on the outdoor side respectively. The suction passageway crosses the exhaust passageway in a heat exchanger and is connected to an indoor exhaust port. A humidifier is disposed between the heat exchanger and an indoor suction ports to humidify and cooler the sucked indoor air within the heat exchanger. Also a reclaimable dehumidifier may be disposed adjacent to the suction blower to decrease the humidity of the sucked outdoor air.

1 Claim, 12 Drawing Figures

SIMPLIFIED AIR CONDITIONER

This application is a continuation application of Ser. No. 90,309 filed Nov. 1, 1979 now abandoned.

BACKGROUND OF THE INVENTION

This invention relates to a simplified air conditioner having no condensing unit, condenser or the like and more particularly to a simplified air conditioner for cooling the air introduced into the room by utilizing a temperature drop due to latent heat consumed in the vaporization of water.

In conventional simplified air conditioners, water has been atomized into the stream of the outdoor air formed by the air blower to be vaporized to remove heat from the air stream due to the heat of vaporization resulting in decreasing the temperature of the air stream. Then the air stream having a lower temperature than the outdoor air is delivered to the room to cool the latter. Conventional simplified air conditioners such as described above are small-sized, inexpensive and healthful as compared with air conditioning apparatus including a condensing unit, the condenser or the like, but have been disadvantageous in that the air stream delivered to the room is humidified enough to prevent the room from being made comfortable because the atomized water humidifies the air stream simultaneously with a decrease in the temperature thereof.

Accordingly it is an object of the present invention to provide a new and improved simplified air conditioner for cooling a room with the outdoor air having both a decreased temperature and humidity controlled to a relatively low magnitude.

SUMMARY OF THE INVENTION

The present invention provides a simplified air coditioner comprising a box member including at least one suction port disposed on each of the indoor and outdoor sides thereof and at least one exhaust port disposed on each of the indoor and outdoor sides thereof, a suction passageway and an exhaust passageway extending through said box between the respective suction ports and the exhaust ports, the suction passageway and the exhaust passageway extending from the indoor side to the outdoor side of the box member, an air blower disposed in the suction passageway to draw the outdoor air therethrough, an air blower disposed in the exhaust passageway to exhaust the indoor air, a heat exchanger disposed in the passageways at the crossing of the suction and exhaust passageways to effect heat exchange between the outdoor air and the indoor air and a humidifier disposed in the exhaust passageway and between the suction port on the indoor side and the heat exchanger to humidify and cool the exhausted indoor air.

Preferably, the humidifier includes a water container and an ultrasonic atomizer for atmizing water within the water container with an ultrasonic wave.

In order to utilize a rotation atomizing technique, the humidifier may also include a water container, a rotation atomizing disc for atomizing water within the water container through the rotation thereof, driving means for rotating the rotation atomizing disc, and a feed water pipe connected to the water container to supply water from within the water container to the rotation atomizing disc.

The humidifier may include a water container, a water injection nozzle connected to the water container, a vent pipe for encircling the end of the water injection nozzle with a very small gap therebetween, and a compressed air generator disposed in the vent pipe to generate compressed air, the compressed air passing through the very small gap to inject water through the end of the water nozzle to atomize the sucked water.

In order to utilize the vaporization technique, the humidifier may include a water container, a rotary drum having the surface formed of a material well wetted with water and partly immersed in water within the water container and driving means for rotating the rotary drum.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENTS

Figure 1:
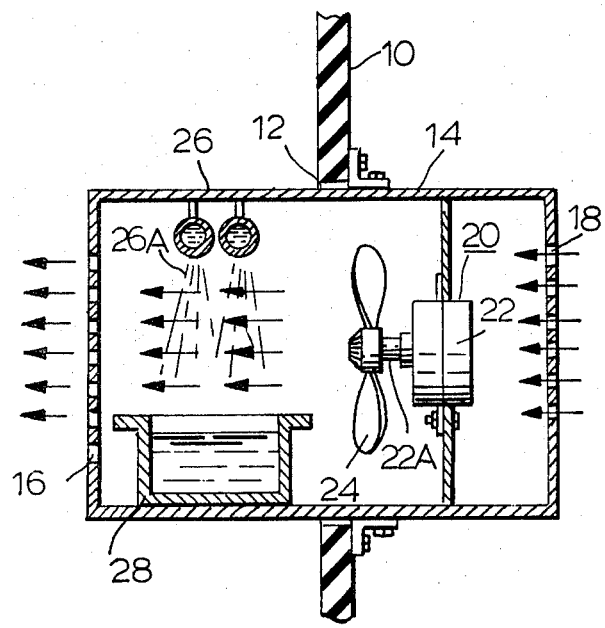
FIG. 1 is a longitudinal sectional view of a conventional simplified air conditioner with parts illustrated in elevation.

Referring now to FIG. 1 of the drawings, there is illustrated a conventional simplified air conditioner which has not condensing unit or condenser. The arrangement illustrated comprises a partition 10 separating the indoor side from the outdoor side and including a opening 12 through which the indoor side communicates with the outdoor side and a box member 14 inserted into the opening 12 and bolted to the partition 10. The box member 14 includes a plurality of exhaust ports 16 disposed on the front surface of the box member 14 on the indoor side and a plurality of suction ports 18 disposed on the surface thereof on the outdoor side. An air blower generally designated by the reference numeral 20 is disposed in that portion of the interior of box member 14 adjacent to the suction ports 16 and includes an electric motor 22 and a vane wheel 24 directly connected to a shaft 22A of the electric motor 22. The motor is electrically connected to an electric source through a switch although the source and switch are not illustrated for purposes of simplifying the drawings.

A plurality of water injection pipes 26, in this case, two pipes are hung from the upper surface as viewed in FIG. 1 of the box member 14 between the exhaust ports 16 and the fan wheel 22 of the air blower 20 and are disposed in spaced parallel relationship and extending perpendicularly to the plane of FIG. 1. Each of the water injection pipes 26 includes a multiplicity of water injection orifices 26A with a very small diameter directed toward the lower surface or bottom of the box member 14. Also a water receiver 28 is disposed on the bottom of the box member 18 opposite the water injection pipes 26. The water injection pipes 26 are connected to a water reservoir through a water line having a feed water pump disposed therein while the water receiver 28 is connected to the reservoir through a water line provided with a circulating pump, although the reservoir, the water lines and the pumps are not illustrated for purposes of keeping the drawings simple.

In operation, the abovementioned switch (not shown) is closed to energize the electric motor 22 to rotate the vane wheel 24. This rotation of the van wheel 24 causes the outdoor air to be sucked into the box member 14 through the suction ports 18 as shown by the righthand arrows in FIG. 1. The sucked outdoor air passes through the interior of the box member 14 until it is introduced into the room through the exhaust ports 16.

Under these circumstances, the feed water pump (not shown) is driven to supply water within the reservoir (not shown) to the water injection pipes 26 to inject the water under a pressure through the water injection orifices 26A whereby the water is atomized.

As a result, the outdoor air introduced into the box member 20 has heat removed therefrom due to the heat of vaporization required for the water to be vaporized thereby to provide air having a lower temperature than the outdoor air. The reduced temperature air is delivered through the exhaust ports 16 to cool the room. The non-vaporized portion of the atomized water falls on the water receiver 28 and then circulates back to the reservoir (not shown) by the operation of the circulating pump (not shown).

In conventional simplified air conditioners such as shown in FIG. 1, the outdoor air has been cooled by means of the heat of vaporization required for atomized water to be vaporized while at the same time it increases the humidity. The increased humidity air is directly introduced into the room to air-condition it. Therefore the room has increased humidity and can not be made comfortable.

Figure 2:
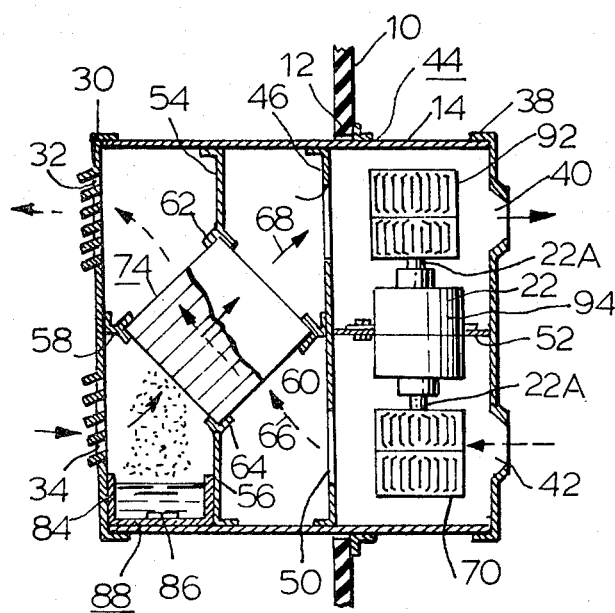
FIG. 2 is a longitudinal sectional view of one embodiment of the simplified air conditioner of the present invention with parts illustrated in elevation.

Referrring now to FIG. 2 wherein like reference numerals designate components identical or corresponding to those shown in FIG. 1, there is illustrated one embodiment of the simplified air conditioner of the present invention. In the arrangement illustrated, the main body of a box member 14 is inserted and fixedly secured to the partition 10 as described above. The box member 14 is shown in FIG. 2 as being formed of a metallic material but it may be of a synthetic resinous material. The box member 14 is in the form of a hollow rectangular parallel piped having a pair of opposite open ends located in the room and outside thereof respectively. The open end of the box member 14 on the indoor side is closed by an indoor cover 30 provided on the upper portion as viewed in FIG. 2 with a plurality of slot-shaped outdoor air exhaust ports 30 disposed in spaced parallel relationship and on the lower portion with a plurality of slot-shaped indoor air suction ports 34 disposed in spaced parallel relationship. The open end of the box member 14 on the outdoor side is closed by the outdoor cover 38 provided on the upper and lower portion with an indoor air exhaust port 40 and an outdoor suction port 42 respectively. The ports 40 and 42 are circular. The covers 30 and 38 are shown in FIG. 2 as being of a metallic material but they may be formed of a synthetic material. Where each cover 30 or 38 is formed of the metallic material, the ports 32 and 34 or 40 and 42 are formed simultaneously with the pressing of the cover 30 or 38. On the other hand, where the cover 30 or 38 is formed of the synthetic resinous material, the ports 32 and 34 or 40 and 42 are formed simultaneously with the molding of the cover 30 or 38.

The box 14 forms a box member generally designated by the reference numeral 44 with the covers 30 and 38. In order to prevent the indoor cover 30 from easily falling off from the box member 14 due to vibrations or like, one of the two components is provided on the overlapped portion with recesses while the other component is provided on the overlapped portion with protrusions complementary in shape to the recesses. Then the cover 30 is connected to the box member 14 by having the recesses on the one component fitted onto the protrusions on the other component due to the elasticity of both components. This is also true in the case of the outdoor cover 38.

A first partition 46 is longitudinally disposed in the box main member 14 to partition it into a pair of lefthand and righthand compartments as viewed in FIG. 2 approximately equal in volume to each other. The first partition 46 is formed of a metallic or synthetic resineous material although it is shown as being of the metallic material. The partition 46 includes a pair of circular openings 48 and 50 aligned with the outdoor ports 40 and 42 respectively to permit the indoor air and the outdoor air to pass therethrough respectively. The first partition 46 has the entire periphery folded into an L-shape and the folded periphery is fixed to the adjacent portion of the inner wall surface of the box member 14 by fusion welding or screws.

A second partition 52 formed of a material similar to that of the first partition 46 divides the righthand compartment into an upper and a lower subcompartment as viewed in FIG. 2. The second partition 52 includes a central opening for a purpose which will be apparent later. The second partition 52 further has the entire periphery folded into an L-shape and the folded periphery is fixed to the adjacent portion of the inner wall surface of the box member 14 by fusion welding or screws but the inner surface of the outdoor cover 38 detachably abuts the folded peripheral portion of the second partition 52.

Third and a fourth partitions 54 and 56 respectively, are aligned with each other longitudinally of the lefthand compartment as viewed in FIG. 2 and fixed to the inner wall surface of the compartment in the same manner as described above in connection with the first partition 46 except for the free edges thereof. By this means the upper and lower portions of the lefthand compartment are respectively partitioned into subcompartments substantially identical to each other. Also the lefthand portion of the lefthand compartment as viewed in FIG. 2 is equally divided by a fifth partition 58 fixed to the middle portion of the inner surface of the indoor cover 20 and the adjacent portion of the inner wall surface of the box member 14 in the same manner as the third or fourth partition 54 and 56. A sixth partition 60 identical to the fifth partition 58 is similarly fixed to the first partition 46 and the adjacent portion of the inner wall surface of the box member 46 to partition the righthand portion of the righthand compartment as viewed in FIG. 2 and be aligned with the fifth partition 58 tranversely of the interior of the box main member.

The third, fourth, fifth and sixth partitions 54, 56, 58 and 60 are formed of a material similar to that of the first partition 46.

The third and fourth partitions 54 and 56 include Y-shaped supports 62 and 64 secured to the free edges and opposed to each other while the fifth and sixth partitions 58 and 60 have the free edges formed into Y-shaped supports opposed to each other. Those four Y-shaped supports define in the central portion of the lefthand compartment a predetermined space large enough to accommodate therein a stationary heat exchanger which will be described hereinafter.

From the foregoing it is seen that the box 44 includes a suction passageway for the outdoor air extending from the outdoor suction port 42 through the lower portion of the righthand compartment, the lower opening 50 in the first partition 46, and the lower, righthand portion, the central portion and the upper, lefthand portion of the lefthand compartment and thence to the exhaust ports 32 as shown by the dotted arrow 66 in FIG. 2, and an exhaust passageway for the indoor air extending from the indoor suction port 34, the lower, lefthand portion, the central portion and the upper righthand portion of the lefthand compartment, the upper opening 48, the upper portion of the righthand compartment and thence to the exhaust port 40 as shown by the solid arrow 68 in FIG. 2 while the suction and exhaust passageways cross each other in the central portion of the lefthand compartment.

As shown in FIG. 2, an electric motor 22 is inserted into the central opening in the second partition 52 and is fixedly secured to that partition by bolts and nuts engaging a flange connected to the housing. Therefore the electric motor 22 is longitudinally disposed in the righthand compartment and includes a rotary shaft 22A extending from both ends thereof. A suction and an exhaust vane wheel 70 and 72 respectively are mounted on the lower and upper end portions of the rotary shaft 22A such as by keys respectively. The vane wheels 70 and 72 are of a metallic or a synthetic resinous material and form a combined suction and air blower generally designated by the reference numeral 74 driven by the electric motor 22. Such an air blower has a well known construction. As shown in FIG. 2, the suction vane wheel 70 is located in the suction passageway 66 while the exhaust vane wheel 72 is located in the exhaust passageway 68. Also as in the arrangement of FIG. 1, the electric motor 22 is electrically connected to an electric source through a switch although the source and switch are not illustrated for purposes of simplifying the drawing.

If desired, the suction and exhaust vane wheels 70 and 72 may be connected to different electric motors.

As shown also in FIG. 2, a stationary heat exchanger generally designated by the reference numeral 74 is detachably disposed in the central space of the lefthand compartment defined by the Y-shaped supports on the third, fourth, fifth and sixth partitions 34, 56, 58 and 60.

Figure 3:
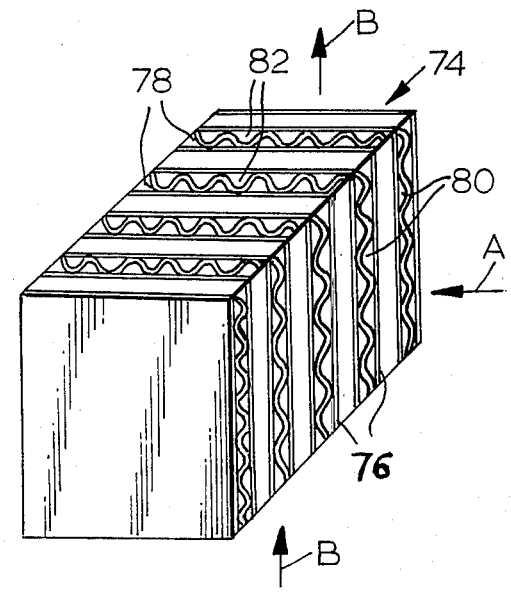
FIG. 3 is a perspective view of the heat exchanger shown in FIG. 2.

As shown in FIG. 3, the stationary heat exchanger 74 includes a plurality of very thin square partitions 76 superposed at predetermined equal intervals to form a stack and a plurality of corrugated spacers 78 coextensive with the partitions 76 and interposed between the adjacent partitions 76. Alternating corrugated spacers 78 have parallel crests and valleys perpendicular to those of the remaining spacers. The crests and valleys of each spacer 78 are fixedly secured to the adjacent partitions 76 through any suitable bonding agent and therefore the spacers are firmly sandwiched between the adjacent partitions 76.

Each partition 76 is formed of a very thin film of a metallic material such as aluminum, stainless, steel or the like which is thermally conductive and substantially impermeable to moisture. If desired, the partition 76 can be made of a synthetic resinous material. Also each spacer 78 is formed of a material similar to that of the partitions 76.

As best shown in FIG. 3, the space formed between each pair of adjacent partitions 76 has the opposite closed edges parallel to the crests and valleys of the spacer 78 interposed therebetween, so that the stack includes a plurality of primary air flow paths 80 and another plurality of secondary air flow paths 82 perpendicular to and physically isolated from the adjacent paths 80.

Therefore the primary air, for example, warm air can pass through the primary air flow paths 80 in the direction of the arrow A shown in FIG. 3 while the secondary air or cold air passes through the secondary air flow paths 82 in the direction of the arrow B shown in FIG. 3. Under these circumstances, heat from the primary air passes through the partitions 76 and is transferred to the secondary air. Accordingly, heat is simultaneously and continuously exchanged between the primary air and the secondary air until the primary air has a temperature approximating that of the secondary air.

The stationary heat exchanger 76 as shown in FIG. 3 is disposed in the central space where the suction passageway 66 crosses perpendicularly to the exhaust passageway 68 so that the primary air flow paths 80 are located in the suction passageway 66 and the secondary air flow paths 82 are located in the exhaust passageway 68. The heat exchanger 76 is detachably supported by the Y-shaped supports 62 and 64 on the third and fourth partitions 54 and 56 and the Y-shaped ends of the fifth and sixth partitions 58 and 60.

In order to remove the heat exchanger 74 from the box 44 and replace it, the box member 14 is provided in a lateral wall with an opening (not shown) large enough to pass the heat exchanger 76 therethrough.

Referring back to FIG. 2, a water container 84 of a metallic material is disposed on that portion of the bottom of the box main member 14 defined by the indoor cover 32 and the fourth partition 56. The water container 84 is formed of a metallic material and is supplied with water through a feed water hole (not shown) disposed in a lateral wall of the box member 14 or the container may be of a synthetic resinous material. An ultrasonic vibrator 88 is disposed at the bottom of the water container 84 and is driven by an ultrasonic oscillator (not shown) to produce droplets from the water disposed in the container 84. Therefore the droplets produced from the water container 84 fill the space defined by the lower half of the indoor cover 32, the partitions 58 and 56, the lateral surface of the heat exchanger 74 connecting those partitions and the water container 84. The water container 84, the vibrator 86, the oscillator form a humidifier generally designated by the reference numeral 88 while the vibrator 86 and the oscillator therefor form a ultrasonic atomizer.

In operation, the switch (not shown) for the electric motor 22 is closed to energize the motor to rotate the suction and vane wheels 70 and 72 respectively. The rotation of the suction vane wheel 70 causes the outdoor air to be sucked through the suction port 42. The sucked outdoor air passes through the rotating vane wheel 70 the lower opening 50 in the first partition 46, the primary air flow paths 80 of the heat exchanger 74, and the exhaust ports 32 in the indoor cover 32 until it is delivered into the room as shown by dotted arrow 66 in FIG. 2.

Simultaneously, the rotation of the exhaust vane wheel 72 causes the indoor air to be sucked through the suction ports 34 in the indoor cover 32 after which the indoor air passes through the secondary air flow paths 82 of the heat exchanger 74, the upper opening 48 in the first partition 46, and the rotating vane wheel 72 until it is exhausted to the atmosphere as shown by the arrow 68 in FIG. 2.

Under these circumstance, the humidifier 88 is operated to atomize the water within the water container 84 with the ultrasonic waves generated by the ultrasonic vibrator 86. Atomized particles of water humidify the exhausted indoor air and remove heat from the latter due to the heat of vaporization resulting in a decrease in temperature of the exhausted indoor air. The exhausted indoor air thus cooled passes through the secondary air flow paths 82 of the heat exchanger 74 while only heat from the sucked outdoor air passes through the partitions 76 to be transferred to the exhausted indoor air. Therefore, only heat is simultaneously and continuously exchanged between the sucked outdoor air and the exhausted indoor air. As a result, the sucked outdoor air is introduced into the room at its absolute humidity similar to that of the outdoor air and at a temperature less than that of the outdoor air without humidification. This means that the room is comfortably cooled without an increase in absolute humidity thereof. On the other hand, the exhausted indoor air has the temperature reduced after its passage through the heat exchanger 74 and is exhausted to the atmosphere through the exhaust port 40.

It has been found that the arrangement as shown in FIG. 2 is optimum for outdoor air having a low humidity.

The humidifier used with the present invention may be variously modified.

Figure 4A:
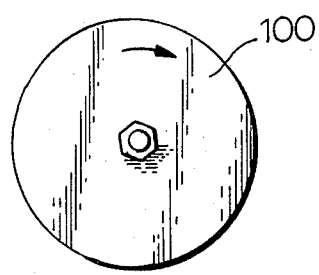
FIG. 4a is a plan view of a rotary disc used with a modification of the humidifier shown in FIG. 2.

FIG. 4 illustrates a modification of the humidifier 88 shown in FIG. 2 wherein a rotation atomizing technique is utilized. The arrangement illustrated comprises a rotary disc 100 formed of a metallic or a synthetic resinous material and including a central small hole (see FIG. 4a) and the main body of an atomizer 102 in the form of a frusto-cone formed of a metallic or a synthetic resinous material. The atomizer's main body 102 includes a larger diameter end having a diameter smaller by predetermined magnitude than that of the rotary disc 100 and rigidly connected to the latter to center it. To this end, a rotary shaft 104 for an electric motor 106 includes a smaller diameter portion just extending through the central hole on the rotary disc 100 and having a threaded and, and the remaining portion equal in diameter to the smaller diameter end of the atomizers main body 102 while the latter includes the central hole equal in diameter to that on the rotary disc 100. The atomizer's main body 102 is threaded onto the smaller diameter portion of the rotary shaft 104 from the smaller diameter end thereof and the rotary disc 100 is threaded onto the small diameter portion of the rotary shaft 104 and a fastening nut 108 engages the threaded end portion of the rotary shaft 104 to rigidly fasten the rotary disc 100 and the atomizer's main body 102 to the larger diameter portion of the rotary shaft 104.

Figure 4B:
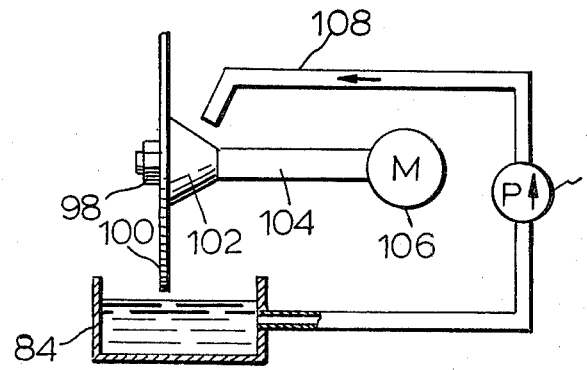
FIG. 4b is a side elevational view of a modification of the humidifier shown in FIG. 2 including the rotary disc illustrated in FIG. 4a with parts illustrated in section.

The water container 84 shown in FIG. 4b as being formed of a metallic material has a feed water pipe 108 connected to the interior thereof below the surface of the water disposed therein. The pipe 108 has the other end opening adjacent to the outer peripheral surface of the atomizer's main body 102 and the feed water pipe 108 is provided with a feed water pump 110.

In operation, the electric motor 106 is driven to rotate the rotary disc 100 and the atomizer's main body 102 at a high speed while the pump 110 is operated to cause water to drop on the outer peripheral surface of the atomizer's main body 102. Water drops falling on the atomizer's main body 102 are moved to the outer periphery of the rotating disc 100 by means of the resulting centrifugal force and surface tension of the water until the water is atomized from the outer periphery of the rotating disc 100 thereby to humidify and cool the exhausted indoor air.

Figure 5:
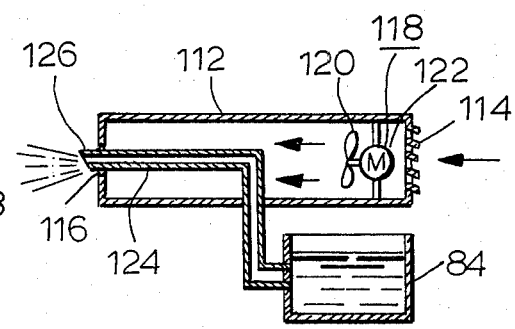
FIG. 5 is a longitudinal sectional view of another modification of the humidifier shown in FIG. 2.

FIG. 5 shows another modification of the humidifier 88 utilizing an atomization nozzle. In the arrangement illustrated a metallic vent pipe 114 in the form of a hollow circular cylinder includes one end provided with a plurality of air intake holes 114 and the other end centrally provided with an air injection orifice 116 having a small diameter. In the vent pipe 112 air blower generally designated by the reference numeral 118 is disposed adjacent to the air intake holes 114 and includes a vane wheel 120 connected to an electric motor 122.

A feed water pipe 124 has end portion opening in the water container 84 below the surface of water charged therein, an intermediate portion extending through the wall vent pipe 112 and sealed therein and the other end portion running along the longitudinal axis of the vent pipe 112. The other end portion of the feed water pipe 112 terminates at a water injection nozzle 126 disposed within the air injection orifice 116 with a very narrow gap formed therebetween.

When the electric motor 122 is operated to rotate the vane wheel 120, the outdoor air is introduced into the vent pipe 112 through the air intake holes 114 as shown by the arrow in FIG. 5 to form compressed air. Thus the air blower 118 acts as a compressed air generator. The compressed air is injected through the gap between the air injection orifice 116 and the adjacent portion of the nozzle 126 as shown by the arrow in FIG. 5. As a result, the extremity of the water injection nozzle 118 is put under a negative pressure thereby to suck water from the water container 84 and the sucked water is atomized through the water injection nozzle 128.

While the water container 84, the vent pipe 114 and the feed water pipe 126 are shown in FIG. 5 as being metallic, those components may be formed of a synetic resinous material.

Figure 6:
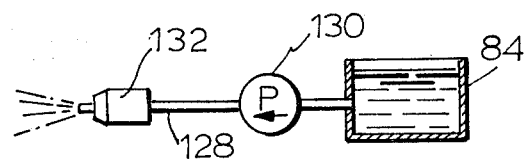
FIG. 6 is a front elevational view, partly in section, of still another modification of the humidifier shown in FIG. 2.

The arrangement illustrated in FIG. 6 also utilizes a water atomization nozzle. As shown, a feed water pipe 128 is connected at one end to the water container 84 as in the arrangement of FIG. 5 and includes a pump 130 disposed therein and a water atomization nozzle 132 disposed at the other end thereof. The pump 130 is operated to pressurize water from the water container 84 and pump the pressurized water through the injection nozzle 132 resulting the atomization of water.

Figure 7A:
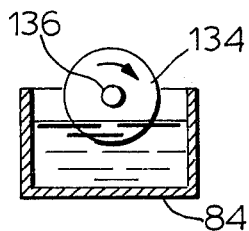
FIG. 7a is a front elevational view, partly in section of a different modification of the humidifier shown in FIG. 2.
Figure 7B:
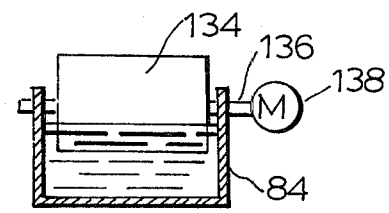
FIG. 7b is a side elevational view of the arrangement shown in FIG. 7a with parts illustrated in section.

FIGS. 7a and 7b show a different modification of the humidifier 88 utilizing the vaporization of water. In the arrangement illustrated a rotary drum 134 includes a surface formed of a material which can be well wetted with water for example, woven fabric, unwoven fabric, a sponge or the like and is partly immersed in water disposed in the water container 84 by having a rotary shaft 136 extending in fixed relationship along the central axis of the rotary drum 134 and rotatably supported at both ends by bearings disposed at the tops of the opposite lateral walls of the water container 84. One end, in this case the righthand end as viewed in FIG. 7b of the rotary shaft 136 is connected to an electric motor 138 through a well-known coupling (not shown).

In operation, the electric motor 136 is operated to rotate the rotary drum 134. During the rotation thereof the rotary drum 134 absorbs water at its surface. As a result the water absorbed by the surface of the drum 134 contacts the exhausted indoor air to be vaporized thereby to humidify the exhausted indoor air.

Figure 8A:
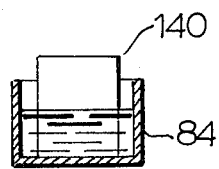
FIGS. 8a and 8b are views similar to FIGS. 7a and 7b respectively but illustrating a separate modification of the humidifier shown in FIG. 2.
Figure 8B:
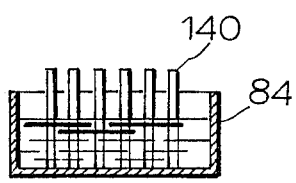

The arrangement illustrated in FIGS. 8a and 8b is different from that shown in FIGS. 7a and 7b only in that in FIGS. 8a and 8b the rotary drum 134 is replaced by a plurality of vaporization plates 140 disposed at predetermined equal intervals and the electric motor 138 is omitted. Each vaporization plate 140 is formed of the same material as the surface of the rotary drum 134 shown in FIGS. 7a and 7b.

In order to increase the cooling effect of the heat exchanger 74, the secondary air flow paths 82 of the heat exchanger 74 along which the exhausted indoor air flows can be formed of partitions 76 and spacers 78 which have been subjected to treatment with a hydrophilic material. The treatment in this case is to stick hydrophilic fibers such as cellulose, protein or the like to those partitions and spacers. Alternatively, the partitions and spacers may be coated with a lithium compound.

In general, atomized water is almost entirely carried by the exhausted indoor air and vaporized and one portion of such water is vaporized after it has been deposited on the heat exchanger 74. However, if the surface of the air flow paths through which the exhausted indoor air flows in the heat exchanger 74 is not hydrophilic then that portion of atomized water deposited to the heat exchanger forms large water drops. Alternatively, it only wets the heat exchanger 74 locally. This results in a poor efficiency of vaporization of water and therefore in a decrease in temperature drop of the exhausted indoor air.

On the other hand, when the heat exchanger 74 subjected to treatment with a hydrophilic material as descried above, atomized water is rapidly and uniformly attached to the air flow paths through which the exhausted indoor air flows without large water drops being formed. This greatly promotes the vaporization of water attached to the heat exchanger to satisfactorily cools the exhausted indoor air. As a result, the heat exchange as described above is effected between the exhausted indoor air satisfactorily cooled and the sucked outdoor air within the heat exchanger. This results in a large increase in efficiency of cooling of the room.

Where the outdoor air has a high humidity, the arrangement of FIG. 2 can not comfortably air-condition the room because there will be no decrease in the absolute humidity of the outdoor air introduced into the room, and the humidity in the room increases.

Figure 9:
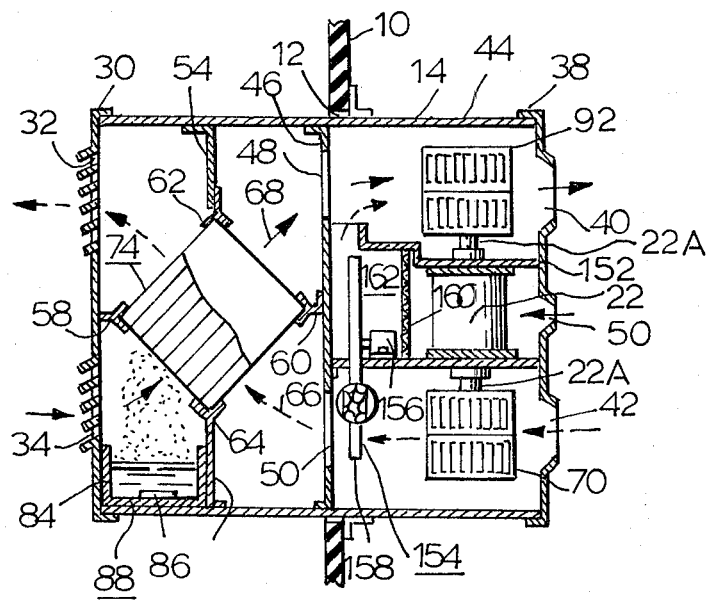
FIG. 9 is a longitudinal sectional view of a modification of the present invention.

Under these circumstances the arrangement illustrated in FIG. 9 can air-condition the room comfortably. The arrangement illustrated is different from that shown in FIG. 2 only in that in FIG. 9 a dehumidifying device is provided to dehumidify the sucked outdoor air. As shown in FIG. 9, the outdoor cover 38 includes in addition to the exhaust and suction ports 40 and 42, an outdoor air intake port 150 disposed in the middle portion thereof. Within the righthand compartment as viewed in FIG. 9 of the box 44 the second partition 52 is located between the intake port 152 and the suction port 42 to define one side of the suction passageway 66 and a seventh partition 152 is located between the exhaust port 40 and the intake port 152 to define one side of the exhaust passageway 68 with a predetermined space between the first and seventh partitions 46 and 152 respectively. This space connects the exhaust passageway 68 to a space located between the seventh and second portions 152 and 52. The electric motor 22 has opposite bearing portions extending through aligned holes disposed on the second and seventh partitions 52 and 152 near the outdoor cover 26 and is fixedly secured to those partitions as described above in conjunction with FIG. 2.

A dehumidifying device generally designated by the reference numeral 154 is disposed in the second partition 52 near the first partition 46. The device 154 includes an electric motor 156 bolted to the second partition 52 and a dehumidifying disc 157 keyed to a rotary shaft for the electric motor 156 to loosely extend through a slot disposed in that portion of the second partition 52 adjacent to the first partition 46 to be parallel to the latter. The dehumidifying disc 15 has a lower haft almost entirely extending into the suction passageway 66 to face the lower opening 50 on the first partition 46 and the remaining portion located between the seventh and second partitions 152 and 52 respectively. The disc 158 includes a circular core (not shown) of a metallic or a synethic resinous material fixed at the center to the rotary shaft for the motor 156 such as by keying and entirely a hygroscope rotor. The hydroscopic rotor may be, for example, a honeycomb-shaped structure formed of asbestos impregnated with a hydroscopic agent such as lithium chloride, silica gel or the like.

An air permeable, electric heater 16 in the form of a wire net is disposed between the electric motor 156 and 22 by having one edge, in this case the upper edge, connected to the seventh partition 152 and the other or lower edge connected to the second partition 52 parallel to the dehumidifying disc 158.

When the sucked outdoor air and the exhausted indoor air flow through the box member 44 as described above in conjunction with FIG. 2, the outdoor air is sucked through the intake port 150 and flows through the electric heater 160. Thereafter the sucked air strikes against the dehumidifying disc 158 and then passes through the space between the first partition 46 and the free edge of the seventh partition 152 as shown by the dotted and dashed arrow 162 in FIG. 9 until it is exhausted through the exhaust port 40 with the exhausted indoor air.

Under these circumstances, the electric motor 156 is operated to rotate the dehumidifying disc 156 and the electric heater 160 is supplied with a so as to be heated.

Accordingly, the outdoor air sucked through the suction port 42 is dehumidified by the rotating dehumidifying disc 158 and the outdoor air thus dehumidified passes through the opening 50 facing the disc 158 after which it is cooled and introduced into the room as described in conjunction with FIG. 2.

On the other hand, that portion of the disc 158 wet with moisture contained in the sucked outdoor air is rotated to enter the passageway 162. The outdoor air sucked through the intake port 150 is heated and dehumidified by the electric heater 160 and flows along the passageway 162 to strike the wetted portion of the rotating disc 158 thereby to dehumidify the latter. That is, the dehumidified portion of the disc 158 is reclaimed. After having been humidified, the reclaiming air is exhausted through the exhaust port 40.

The reclaimed portion of the disc 158 is rotated to again enter the suction passageway 66 where the process as described above is repeated. As a result, the dehumidifying disc 158 can continue to dehumidify the sucked outdoor air in a semipermanent manner without the saturated state being reached.

From the foregoing it is seen that in the arrangement of FIG. 9 the dehumidifying device 164 can dehumidify the outdoor air even though it is very humid thereby to permit the outdoor air having both a low humidity and temperature to be introduced into the room resulting the excellent air-conditioning. Also the dehumidifying disc 158 is repeatedly wetted and reclaimed to permit excellent air-conditioning to be indefinitely maintained.

In the arrangement of FIG. 9, the secondary air flow paths of the heat exchanger 74 may be subjected to hydrophilic treatment as described above thereby to increase the efficiency of heat exchange.

From the foregoing it is seen that the present invention provides a simplified air-conditioner for comfortably air-conditioning the room by introducing thereinto outdoor air controlled to have both a low temperature and a low humidity without a condenser, a condensing unit or the like. Also, the simplified air conditioner of the present invention may be used as a ventilation device for sucking the outdoor air and exhausting indoor air with the humidifier remaining inoperative.

While the present invention has been illustrated and described in conjunction with a few preferred embodiments thereof it is to be understood that numerous changes and modification may be resorted to without departing from the spirit and scope of the present invention. For example, the arrangements shown in FIGS. 2 and 4 may be modified so that the heat exchanger includes means for switching over the directions of the air flowing therethrough. This measure permits the outdoor an introduced into the room to be selected to be optimum in accordance with the particular weather conditions. Also there may be provided means for circulating the indoor air back through the room after it has passed through the humidifier. In the latter case, the humidifier can be operated as a humidifier for the room.

Further, in the arrangement of FIG. 9, one portion of the exhausted indoor air may be used as the reclaiming air.

What we claim is:

1. A simplified air condition, comprising: a box member including at least one suction portion on each of the indoor and outdoor sides thereof, and at least one exhaust port disposed on each of the indoor and outdoor sides thereof, a suction passageway and an exhaust passageway extending through said box member between the respective suction and exhaust ports, said passageways crossing each other between said suction and said exhaust ports; a suction air blower disposed in said suction passageway to draw the outdoor air through said suction passageway; an exhaust air blower disposed in said exhaust passageway to exhaust the indoor air through said exhaust passageway; a heat exchanger disposed in said passageways at the crossing of said suction and exhaust passageways to effect heat exchange between the outdoor air and the indoor air; a humidifier disposed in said exhaust passageway and between said suction port on the indoor side and said heat exchanger to humidify and cool the exhausted indoor air; and a dehumidifier device disposed in said suction passageway between said suction blower and said heat exchanger to dehumidify the outdoor air, said dehumidifying device having a rotary dehumidification disc and driving means for rotating said rotary dehumidification disc, substantially half of said dehumidification disc extending transversely of said suction passageway to dehumidify the outdoor air, a reclaiming air passageway extending into said box member from the outdoor side of said box member to said exhaust passageway upstream of said exhaust air blower, the other half of said rotary dehumidification disc outside of said suction passageway extending transversely into said reclaiming air passageway; and a heater means disposed in said reclaiming air passageway upstream of said other half of the rotary dehumidification disc for heating outdoor air sucked through said reclaiming air passageway.

* * * * *